US006463258B1

(12) United States Patent
Goldman

(10) Patent No.: US 6,463,258 B1
(45) Date of Patent: Oct. 8, 2002

(54) ELECTRICAL FLASH CARD UNIT AND METHOD OF USE

(76) Inventor: David A. Goldman, 538 Croton Heights Rd., Yorktown Heights, NY (US) 10598

(*) Notice: Subject to any disclaimer, the term of this patent is extended or adjusted under 35 U.S.C. 154(b) by 0 days.

(21) Appl. No.: 09/203,867

(22) Filed: Dec. 2, 1998

Related U.S. Application Data

(63) Continuation-in-part of application No. 09/170,899, filed on Oct. 13, 1998, which is a continuation-in-part of application No. 08/837,367, filed on Apr. 17, 1997, now Pat. No. 5,881,482.

(51) Int. Cl.[7] .................................................. G09B 5/00

(52) U.S. Cl. .......................... 434/310; 434/311; 40/502

(58) Field of Search ................................ 434/310, 311, 434/314, 370, 416, 419, 426, 427, 428; 235/1 A, 1 C, 77, 78 G, 78 M; 40/433, 434, 451, 452, 502

(56) References Cited

U.S. PATENT DOCUMENTS 536,526 A * 3/1895 Hooley ....................... 434/416
2,092,577 A * 9/1937 Hornung ..................... 434/344
2,178,906 A * 11/1939 Haumerson ................. 434/344
2,360,212 A * 10/1944 Dudley ................... 434/426 X
2,511,334 A * 6/1950 Gruber
2,728,155 A * 12/1955 Hunter ........................ 40/502
2,737,744 A * 3/1956 Sturges et al. ............ 40/502 X
2,795,878 A * 6/1957 Welland ...................... 40/502
3,040,458 A * 6/1962 Mathews ..................... 40/502
3,103,750 A * 9/1963 Werner ....................... 434/344
3,159,937 A * 12/1964 Barnes ..................... 40/502 X
3,164,918 A * 1/1965 Brown ...................... 40/502 X
3,292,289 A * 12/1966 Fuhr ........................ 40/502 X
3,358,396 A * 12/1967 Prince ...................... 40/502 X
4,143,473 A * 3/1979 Mitsuya ....................... 40/426
4,731,027 A * 3/1988 Phinney ...................... 434/348

* cited by examiner

*Primary Examiner*—Sam Rimell
(74) *Attorney, Agent, or Firm*—John H. Crozier

(57) ABSTRACT

In a preferred embodiment, a flash card unit, including: a housing; receiving means to receive in the housing a flash card having thereon at least first and second graphics; illuminating apparatus disposed in the housing to selectively illuminate at least one of the first and second graphics; the first graphic including a problem to be solved; and the second graphic including an answer to the problem.

18 Claims, 4 Drawing Sheets

ELECTRICAL FLASH CARD UNIT AND METHOD OF USE

CROSS-REFERENCE TO RELATED APPLICATIONS

The present application is a continuation-in-part of copending application Ser. No. 09/170,899, filed Oct. 13, 1998, and titled DISPLAY HAVING SELECTABLE SIMULATED ILLUMINATING MEANS, now pending, which is a continuation-in-part of Ser. No. 08/837,367, and titled DISPLAY HAVING SELECTABLE SIMULATED ILLUMINATING MEANS, filed Apr. 17, 1997, now U.S. Pat. No. 5,881,482, issued Mar. 16, 1999. Material in the present application was disclosed in Disclosure Document No. 438,274, filed Jun. 30, 1998.

BACKGROUND OF THE INVENTION

1. Field of the Invention

The present invention relates to teaching aids generally and, more particularly, but not by way of limitation, to a novel flash card unit.

2. Background Art

Flash cards are commonly used to teach or reinforce learning. Such flash cards are made in a variety of forms and sizes with typical arithmetic and spelling problems and like materials in graphic form for problem solving, identification, and spelling. The flash cards may present an arithmetic, spelling, or identification problem on one side thereof which is presented to a student. The student gives an answer and then the card is turned over to reveal the correct answer on the reverse side thereof.

A disadvantage of such flash cards is that, typically, only one problem is presented on each side of a card, so that it is necessary to have a fairly large number of cards to present a large number of problems. Furthermore, such conventional flash cards are usually rather plain and do not attract the attention of a student.

Accordingly, it is a principal object of the present invention to provide a flash card unit that can present a plurality of problems with one card and which can state problems and answers on one side of the card.

It is a further object of the invention to provide such a flash card unit that is attractive and commands the attention of a student.

It is an additional object of the invention to provide such a flash card unit that is economical to construct and simple to use.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing in a preferred embodiment, a flash card unit, comprising: a housing; receiving means to receive in said housing a flash card having thereon at least first and second graphics; illuminating means disposed in said housing to selectively illuminate at least one of said first and second graphics; said first graphic including a problem to be solved; and said second graphic including an answer to said problem.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Figure 1:
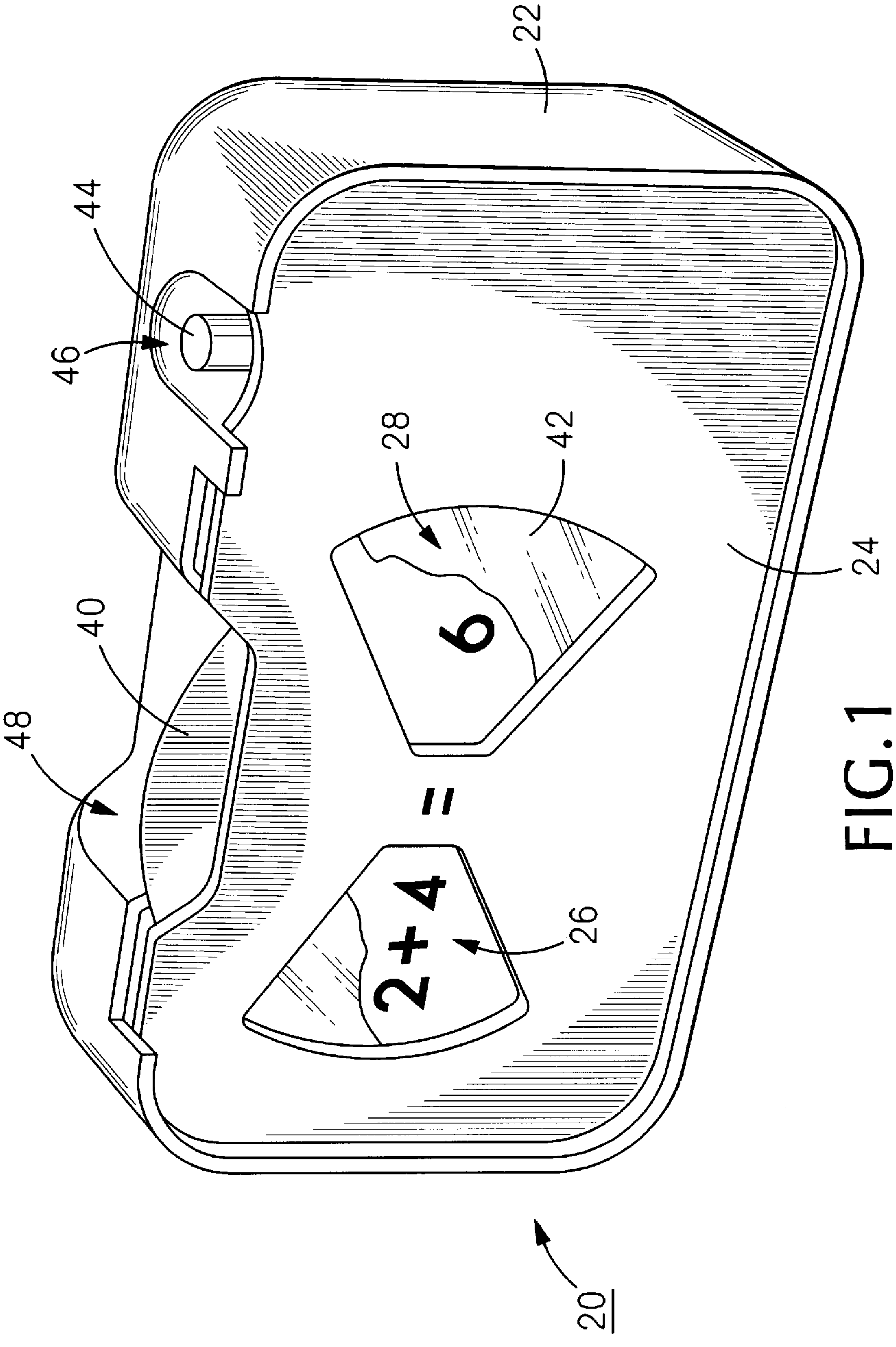
FIG. 1 is an isometric view, partially cut-away, of a flash card unit constructed according to one embodiment of the present invention.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

FIG. 1 illustrates a flash card unit, generally indicated by the reference numeral 20, and constructed according to one embodiment of the present invention. Unit 20 includes a housing 22 having a front cover 24 through which are defined first and second apertures 26 and 28, the housing and the front cover being frictionally attached together and manually separable. Alternatively, a catch or other suitable mechanical means of attachment may be provided. A rotatable flash card 40 is disposed in unit 20 and includes thereon problems, such as the arithmetic problem "2+4" visible through first aperture 26, with the answer "6" visible through second aperture 28.

A light translucent layer 42 is disposed between first and second apertures 26 and 28 and the problem presented on flash card 40 to obscure the problem and its answer unless either or both the problem and its answer are illuminated by pressing two-position switch 44 accessible through an opening 46 defined through a side of housing 22. Alternatively, layer 42 may be wholly or partially optically transmissive and/or reflective. Switch 44 is protectively recessed in opening 46 so as to minimize the possibility that the switch will accidentally remain depressed. Layer 42 may be applied to the surface of flash card 40 or it may be the material of the body of the flash card itself. Translucent layer 42 may be colored such that opaque material of the same color behind the front surface appears dark when illuminated but is not visible otherwise. An edge of flash card 40 is manually grippable through an opening 48 defined in housing 22 so that the flash card can be manually rotated to selected positions. In some applications, translucent layer 42 need not be employed to mask a picture or problem shown in one aperture, with or without illumination.

Figure 2:
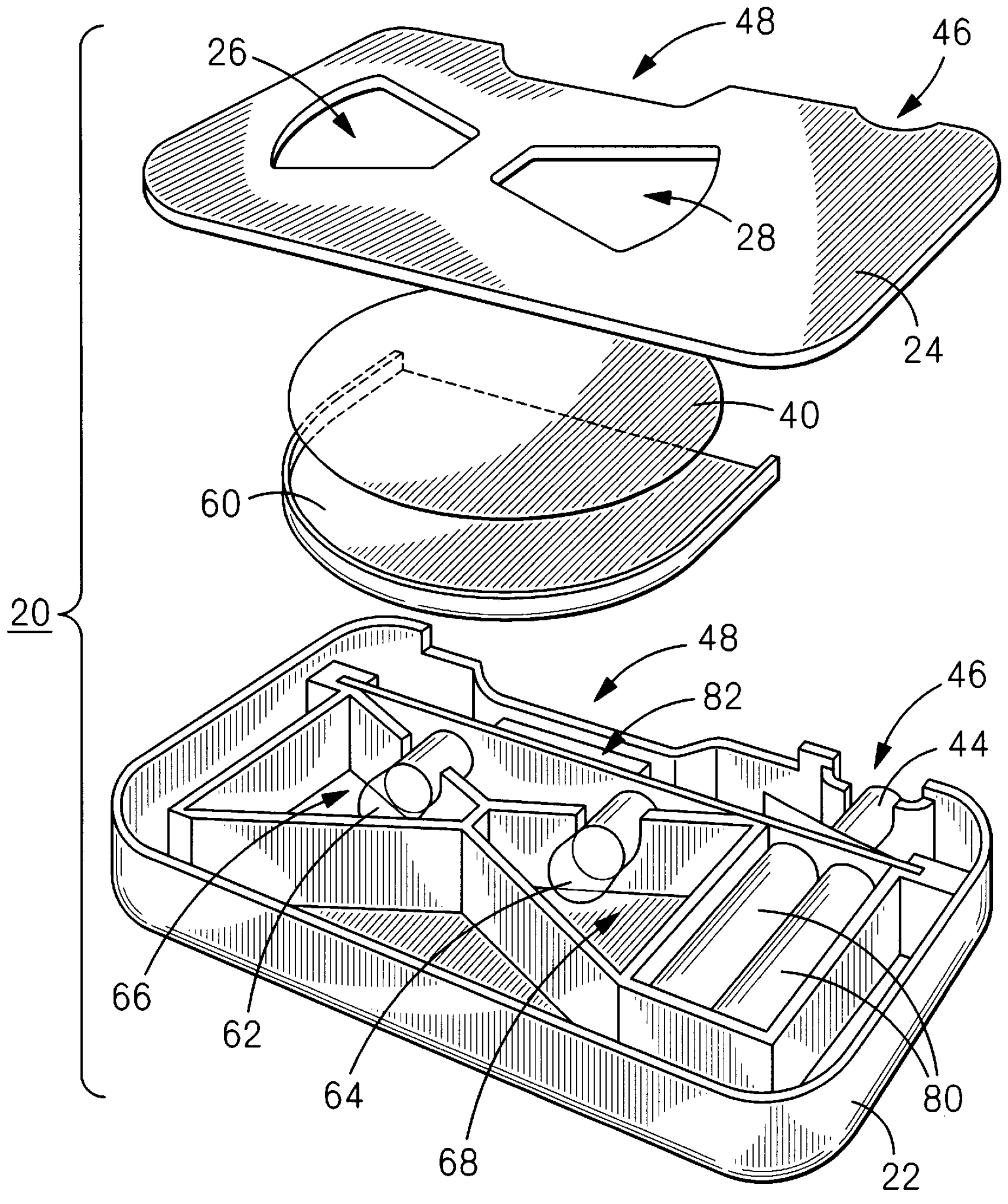
FIG. 2 is an exploded isometric view of the flash card unit of FIG. 1.

FIG. 2 illustrates the components of unit 20 described above and, in addition, describes the internal components of the unit. A clear window, disk holder 60 is provided to support flash card 40 and to permit rotation of the flash card in the disk holder, the disk holder being fixedly attached to front cover 24 by suitable means such as by means of an adhesive, for example. Alternatively, disk holder 60 may be held on the back of front cover 24 by being frictionally gripped in a rim molded in the back of the front cover. Disk holder 60 has a smooth inner surface so that card 40 may be easily rotated therein and serves to protect first and second light sources 62 and 64 and the user of unit 20.

First and second light sources 62 and 64 are provided, respectively, in first and second compartments 66 and 68 disposed, respectively, behind first and second apertures 26 and 28 to selectively illuminate the graphic images on flash disk 40. First and second compartments 66 and 68 may have reflective surfaces and may be curved to achieve uniform illumination. First and second light sources 62 and 64 are isolated from each other so that only a graphic image associated with a respective one of first and second apertures 26 and 28 is illuminated by a particular light source. Batteries, as at 80, are provided to provide power to first and second light sources 62 and 64 and electronic circuitry 82 may be provided for operation of the first and second light sources. Batteries 80 may be changed from the rear of unit 20 by removing a cover (not shown) provided for that purpose.

In use, flash card 40 is inserted into unit 20 (FIG. 1) so that a problem is aligned with first and second apertures 26 and 28. Switch 44 is then depressed to its first position which causes first light source 62 to be illuminated, thus rendering "2+4" visible through first aperture which is viewed by a student. The student then gives an answer and switch 44 is depressed to its second position which causes second light source 64 to be illuminated, thus rendering the answer "6" visible through second aperture 28. Electronic circuitry may cause first and/or second light sources 62 and 64 to blink or to successively blink and hold steady or vice versa. To save battery power, first light source 62 may be turned off when second light source 64 is illuminated. The short use of first and second light sources 62 and 64 also conserves battery power. Flash card 40 is then manually rotated to a new position and the above procedure repeated. When all problems on flash card 40 have been used, the flash card is removed from unit 20 and a new flash card inserted therein. Each problem on flash card 40 may be printed on the upper back edge of the flash card so that the problem being presented will be evident to the presenter. Flash card 40 is not limited to presenting arithmetic problems, but also may be used to present objects or animals for identification or name spelling, for example, or for phonics without some letters visible without illumination.

Figure 3:
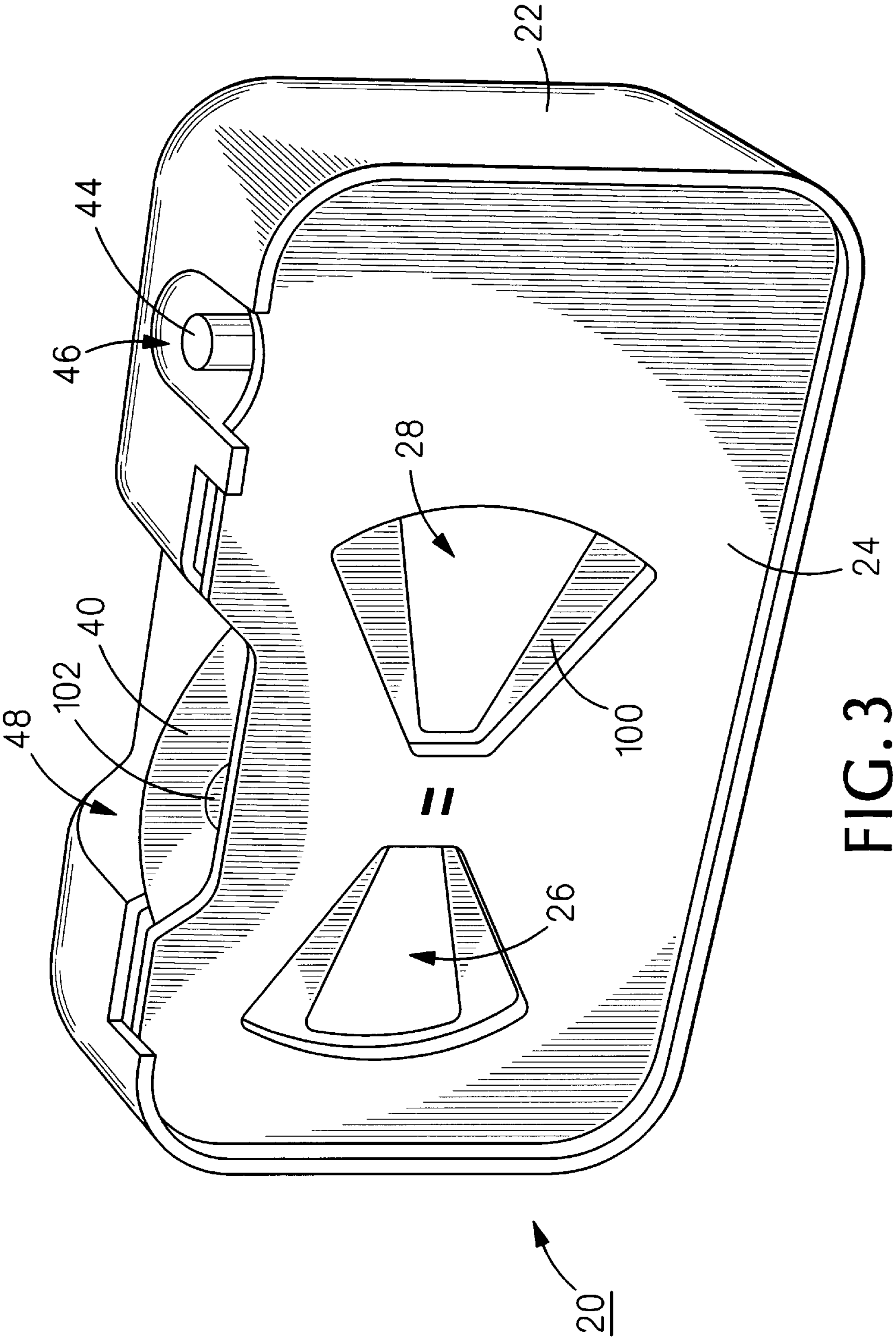
FIG. 3 is an isometric view of the flash card unit of FIG. 1, including mask means to permit additional problems to be presented on a single flash card.

FIG. 3 illustrates unit 20 with a mask 100 inserted in card holder 60 (FIG. 2), the mask being provided to reduce the area of flash card 40 visible through first and second apertures 26 and 28 so as to increase the number of problems that may be presented on the flash card. A tab 102 is provided on mask 100 to facilitate insertion and removal of the mask.

Figure 4:
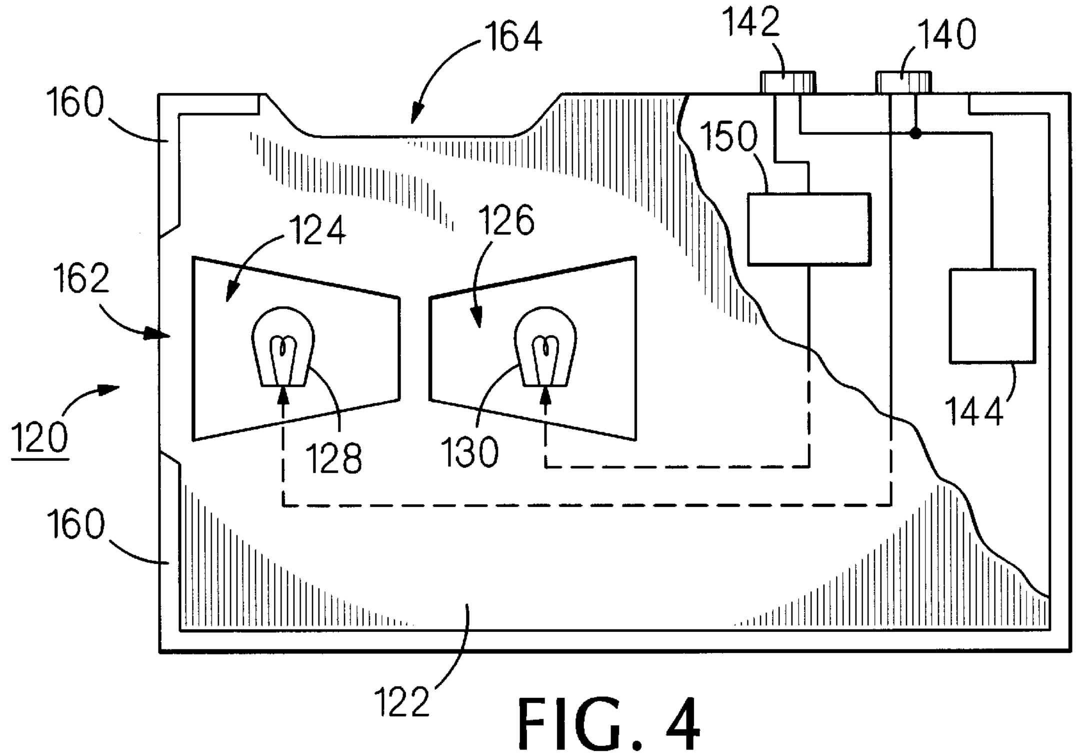
FIG. 4 is a front elevational view, partially cut-away, of a flash card unit constructed according to another embodiment of the present invention.

FIG. 4 illustrates another flash card unit, generally indicated by the reference numeral 120, and constructed according to another embodiment of the present invention. Unit 120 includes a covered housing 122 having defined through the face thereof first and second apertures 124 and 126 through which are visible, respectively, first and second light sources 128 and 130. First and second light sources 128 and 130 are isolated one from the other in similar manner to first and second light sources 62 and 64 in unit 20 (FIG. 2). In this case, unit 120 has two switch buttons 140 and 142 to selectively connect, respectively, a source of power 144, such as batteries, for example, to first and second light sources 128 and 130. Additionally, an electronic or electromechanical flasher circuit 150 is connected in the power line to second light source 130 so that light source will blink when second switch button 142 is depressed. Ridges 160, including the four corners of unit 120 extend orthogonally forwardly of the front surface of the unit. A gap 162 is provided in ridges 160 at one side of the unit and a gapless cutout 164 is provided at the top of the unit.

Figure 5:
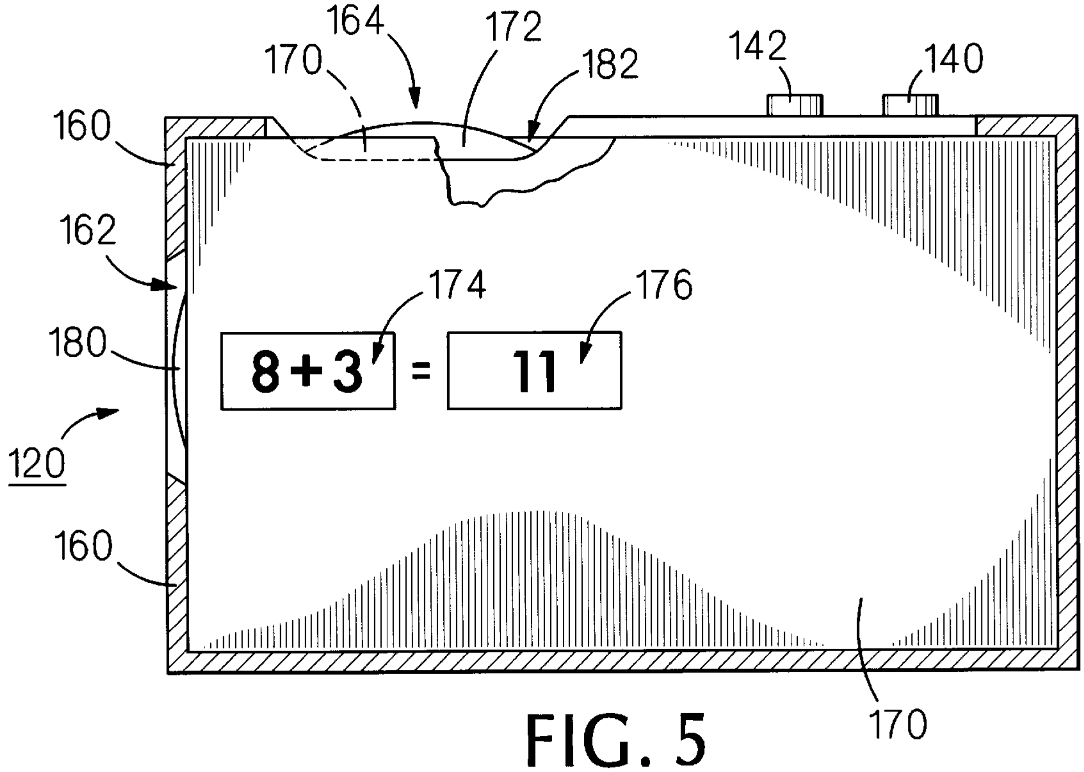
FIG. 5 is a front elevational view, partially cut-away, of a flash card assembly inserted in the flash card unit of FIG. 4.

FIG. 5 illustrates unit 120 with a flash card assembly 170 inserted therein and frictionally held therein by means of ridges 160. Flash card assembly 170 comprises an open ended or closed ended sleeve with a flash card 172 rotatingly disposed therein and attached, for example, to the rear portion of the sleeve by means of an eyelet. The sleeve of assembly 170 includes first and second apertures 174 and 176 defined therethrough, corresponding to first and second apertures in unit 120 (FIG. 4), so that a problem, in this case "8+3=11" is visible through the apertures when first and second light sources 128 and 130 are illuminated as shown on FIG. 5. A portion 180 of flash card 172 extends into gap 162 so that the flash card may be conveniently rotated by means of an index finger, for example. The upper portion of flash card 172 extends into cutout 164 and is visible through a cutout 182 in the rear portion of the sleeve of flash card assembly 170 so that the problem printed on the rear surface of flash card 172 may be viewed by a presenter. Additional cutouts (not shown) in unit 120 and the rear of flash card assembly 170 may be provided to view additional information concerning the problem being presented. Also, additional information may be provided on the front of card 172 and information on both the front and the rear of flash card assembly 170 may be read when the flash card assembly is removed from unit 120.

Unit 120 and flash card assembly 170 are used in a manner similar to that described above with respect to unit 20 and flash card 40 (FIGS. 1 and 2).

Although two apertures are shown in units 20 and 120, additional apertures may be provided. Also, as illustrated on FIG. 5, first and second apertures 124 and 126 do not have to be coextensive, respectively, with first and second apertures 174 and 176, first and second apertures 124 and 126 being shown larger than first and second apertures 174 and 176, the extent of the field of view being determined by the size of the latter pair of apertures.

Also, only one light source may be provided to illuminate, for example, only the answer to a problem.

Rather than providing electric light sources as described above, reflective flaps, such as are described in the above-referenced application Ser. No. 09/170,899, may be provided rearwardly of the flash card and selectively positioned to illuminate graphics on a flash card.

In the embodiments of the present invention described above, it will be recognized that individual elements and/or features thereof are not necessarily limited to a particular embodiment but, where applicable, are interchangeable and can be used in any selected embodiment even though such may not be specifically shown.

Terms such as "upper", "lower", "inner", "outer", "inwardly", "outwardly", and the like, when used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A flash card unit, comprising:

(a) a housing;

(b) receiving means to receive in said housing a flash card having thereon at least first and second graphics;

(c) first and second illuminating means disposed in said housing to selectively illuminate at least one of said first and second graphics;

(d) said first graphic including a problem to be solved;

(e) said second graphic including an answer to said problem; and (f) said first illuminating means includes means to direct light through said first graphic when said first illuminating means is illuminated.

2. A flash card unit, as defined in claim 1, wherein: said first illuminating means flashes when illuminated.

3. A flash card unit, as defined in claim 1, wherein: said illuminating means includes second illuminating means to direct light through said second graphic when said second illuminating means is illuminated.

4. A flash card unit, as defined in claim 3, wherein: said second illuminating means flashes when illuminated.

5. A flash card unit, as defined in claim 1, wherein: said illuminating means includes first and second illuminating means which are isolated one from the other by separating means such as to limit areas illuminated by said first and second illuminating means.

6. A flash card unit, as defined in claim 1, wherein: at least a portion of at least one of said first and second graphics is invisible to a viewer when said portion is not illuminated and said portion is visible when illuminated by said illuminating means.

7. A flash card unit, as defined in claim 1, further comprising:

(a) a cover attachable to said housing;

(b) at least first and second apertures defined through said cover;

(c) said receiving means comprises a slot defined in said housing; and (d) said first and second graphics being visible through said first and second apertures when said flash card is inserted in said slot.

8. A flash card unit, as defined in claim 7, wherein: at least a portion of at least one of said first and second graphics is invisible to a viewer when said portion is not illuminated and said portion is visible when illuminated by said illuminating means.

9. A flash card unit, as defined in claim 7, further comprising: a flash card holder disposed in said housing to retain said flash card and to permit movement of said flash card within said flash card holder.

10. A flash card unit, as defined in claim 9, wherein: inner surfaces of said flash card holder have smooth surfaces to facilitate the movement therein of said flash card.

11. A flash card unit, as defined in claim 7, wherein: a mask is insertable in said slot in front of said flash card to reduce visible area of said flash card in order to increase amount of graphics or problems presentable on said flash card.

12. A flash card unit, as defined in claim 1, wherein: said illuminating means comprises at least one electric light bulb.

13. A flash card unit, as defined in claim 1, wherein: at least a portion of at least one of said first and second graphics is invisible to a viewer unless said portion is illuminated from behind.

14. A flash card system, comprising:

(a) a housing;

(b) selectively illuminatable first and second light sources disposed in said housing, said first and second light sources being disposed, respectively, behind first and second apertures defined through a front surface of said housing;

(c) a flash card assembly insertable in said housing, said flash card assembly including a flash card movably disposed within a sleeve, said sleeve having third and fourth apertures defined therethrough and aligned, respectively, with said first and second apertures;

(d) said flash card having thereon at least first and second graphics, said graphics being invisible to a viewer when said graphics are not illuminated; and (e) a switch to activate said first and second light sources to selectively illuminate, respectively, one or both of said first and second graphics to render said first and second graphics visible to a viewer.

15. A method of using a flash card unit, said flash card unit including a housing, receiving means to receive in said housing a flash card having thereon at least first and second graphics, and first and second illuminating means disposed in said housing to selectively illuminate, respectively, one or both of said first and second graphics said method comprising:

(a) inserting in said receiving means a flash card in a first selected position;

(b) illuminating one of said first and second graphic so as to permit an illuminated one of said one of said first and second graphics to be visible to a viewer;

(c) permitting said viewer to provide information as said one of said first and second graphics; and (d) illuminating other of said first and second graphics to permit an illuminated said other of said first and second graphics to be visible to said viewer.

16. A method of using a flash card unit, as defined in claim 15, further comprising the step of:

(e) relating said information to said other of said first and second graphics.

17. A method of using a flash card unit, as defined in claim 15, further comprising the step of:

(e) moving said flash card in said receiving means to at least a second selected position.

18. A method of using a flash card unit, as defined in claim 15, wherein: at least one step of illuminating further includes providing blinking illumination.

* * * * *